May 10, 1932.　　　　M. DE BOIGNE　　　　1,857,945
GUN CARRIAGE
Filed Aug. 7, 1931　　　4 Sheets-Sheet 1
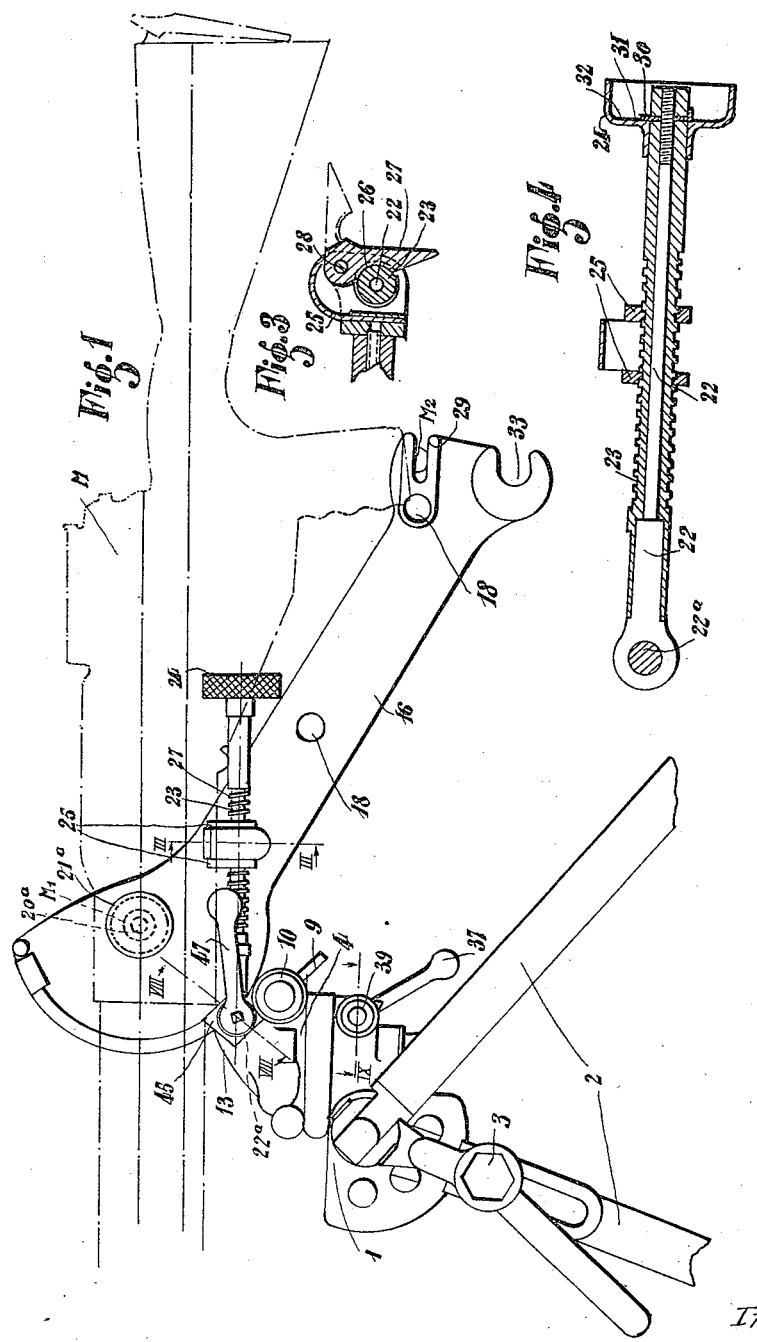
Inventor:
Maurice DeBoigne,
By Wilkinson & Mawhinney,
Attys.

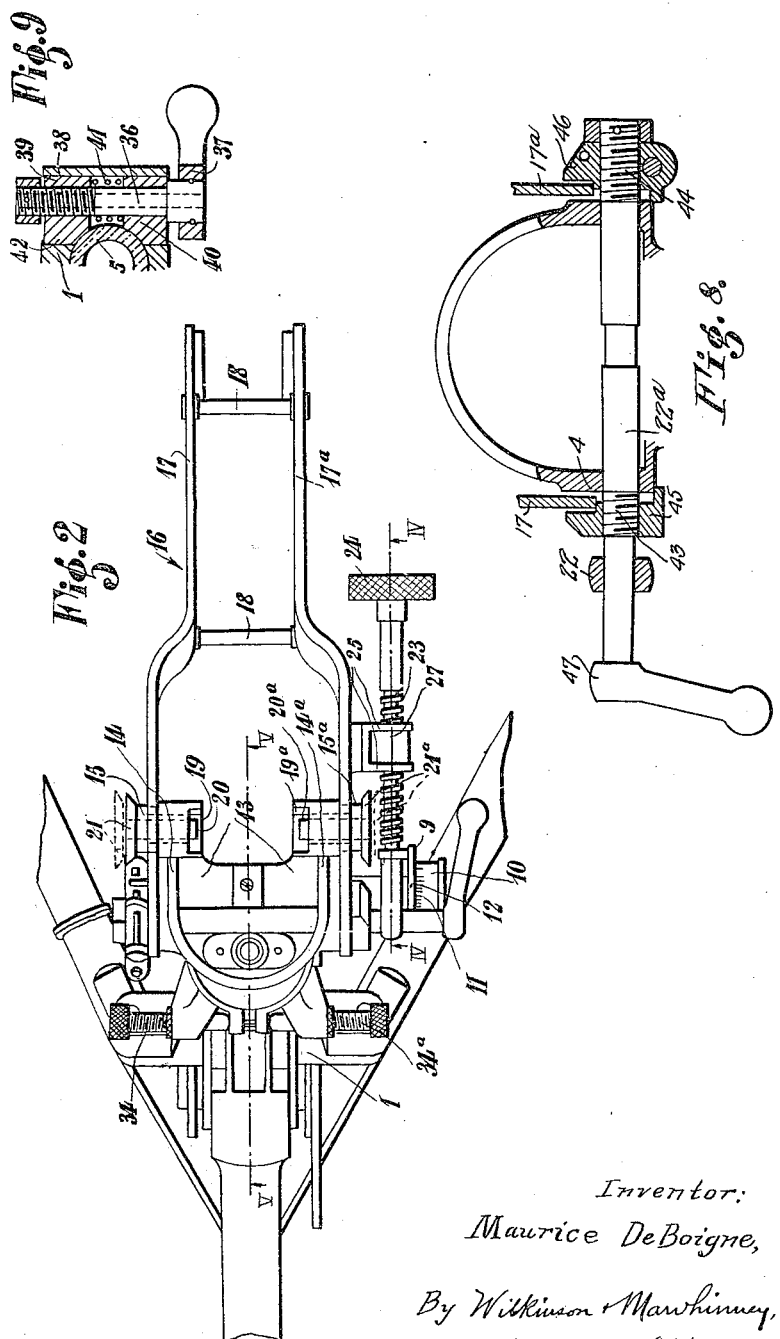

Inventor:
Maurice DeBoigne,
By Wilkinson & Mawhinney,
Attys.

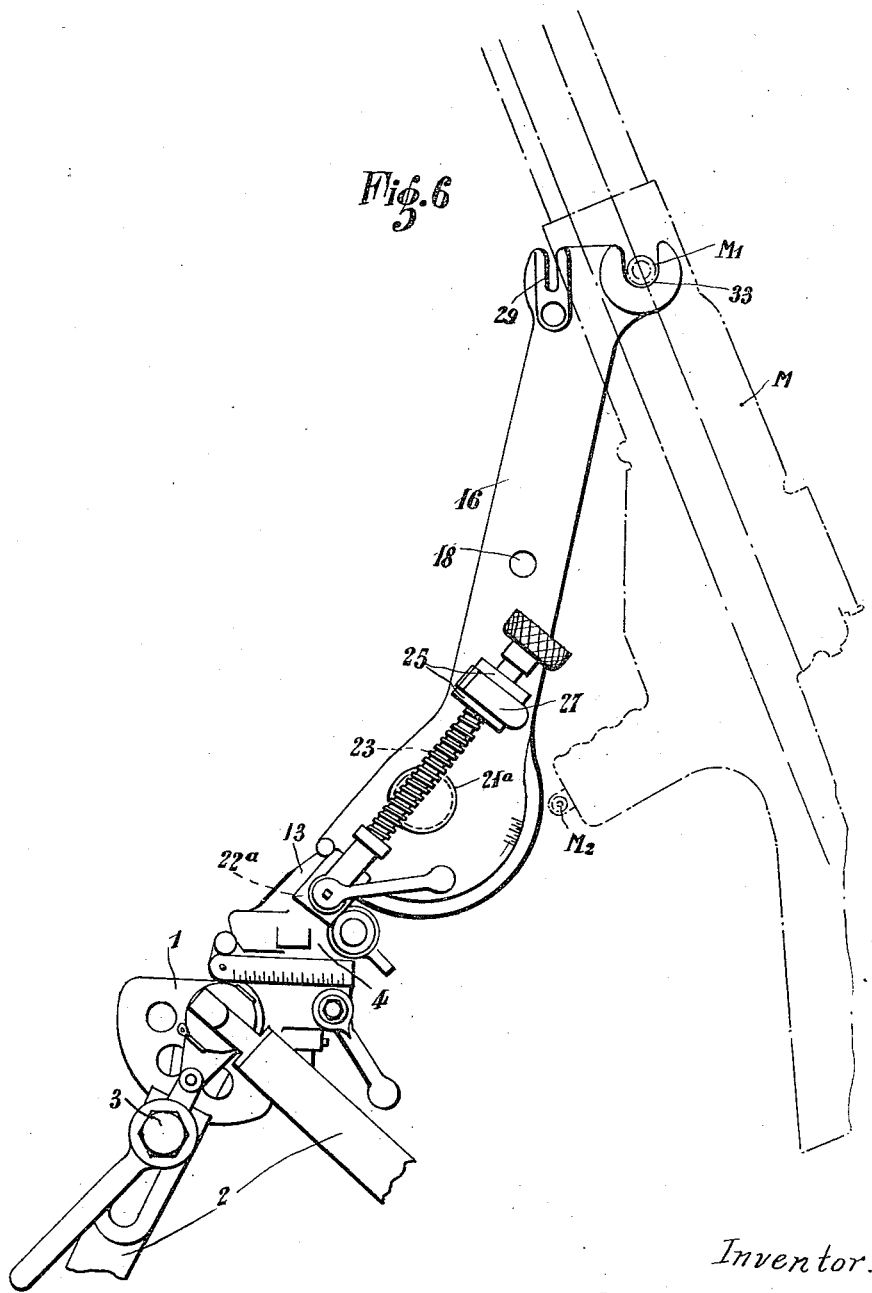

Patented May 10, 1932

1,857,945

UNITED STATES PATENT OFFICE

MAURICE DE BOIGNE, OF PARIS, FRANCE, ASSIGNOR TO SOCIETE ANONYME DES ANCIENS ETABLISSEMENTS HOTCHKISS & COMPAGNIE, OF ST. DENIS, FRANCE, A JOINT-STOCK COMPANY OF FRANCE

GUN CARRIAGE

Application filed August 7, 1931, Serial No. 555,847, and in France August 12, 1930.

The present invention relates to a carriage for a machine gun or a light gun, for ground firing and anti-aircraft firing.

Said carriage comprises, in the usual manner, a tripod and a carriage body mounted on said tripod. It is essentially characterized by the fact that, on said carriage body is pivotally mounted a swinging support having a traversing gear, a cradle accommodating the machine gun, and having an elevating gear being pivotally mounted on said support.

The pivotal axis of the cradle is near its front end, so that for anti-aircraft firing, the said cradle can be brought into a very inclined position in which its rear end, which in that case constitutes the upper end and supports the gun, is right above the carriage body.

The elevating gear of the cradle can be put out of action, thereby enabling the swinging of the cradle to be directly controlled and so bring it very rapidly into any required position, for example, into the anti-aircraft firing position, a blocking device being provided to hold said cradle stationary in any position desired.

Said elevating gear comprises a screw which is adapted to rotate about a fixed axis on the swinging support, guided in a support carried by the cradle and with which cooperates a portion of a nut also carried by the cradle and which can either take up an operative position, in which it is in engagement with the screw, or an inoperative position, in which it is disengaged from said screw.

According to one embodiment, the screw is recessed and is mounted on a rod on which it can rotate, the said rod carrying at its end a fixed graduation which, by cooperating with a graduation carried by the screw or the manipulating knob secured to said screw, enables elevating to be performed.

Means are provided for fixing the machine gun on the carriage for ground firing, said means comprising, on the one hand, housings provided at the upper end of the swinging support and accommodating the trunnions of the gun, so that the axis of said trunnions lies along the pivotal axis of the cradle of said swinging support, and, on the other hand, grooves provided in the rear end of the cradle, and in which the rear end of the gun engages, the latter thus following all the movements of the cradle and can consequently be aimed for elevation and in direction by means of the devices provided for that purpose.

Preferably, the trunnions are held in the corresponding housings by spring catches arranged along the axis of said housings.

For anti-aircraft firing, the trunnions of the machine gun are merely engaged in the housings provided towards the rear end of the cradle (upper end for anti-aircraft firing), the gun being in that case completely independent and aimed for elevation and in direction by the direct action of the gunner on said gun.

The traversing gear which can be put out of action as can also the elevating gear, comprises a worm carried by the swinging support and eccentrically mounted in a socket which can take up two positions, viz: a position in which the worm is in engagement with a fixed toothed ring, carried by the carriage body, so that the rotation of the worm about its axis causes a pivoting movement of the swinging support relatively to the body of the carriage (aiming in direction), and a second position in which the worm is disengaged from the fixed toothed ring.

A blocking device for the traversing gear enables the swinging support to be held stationary in any desired position.

Other features and peculiarities of the invention will become apparent from the ensuing description taken in conjunction with the accompanying drawings in which:

Fig. 1 is an elevation (left hand side) of a gun carriage according to the invention, in position for horizontal firing;

Fig. 2 is a corresponding plan view.

Fig. 3 is a sectional view of a detail along the line III—III of Fig. 1.

Fig. 4 is a sectional view of a detail along the line IV—IV of Fig. 2.

Fig. 6 is an elevation, similar to Fig. 1, but showing the gun carriage in position for anti-aircraft firing.

Fig. 8 is a sectional view along the line VIII—VIII of Fig. 1.

Fig. 9 is a sectional view along the line IX—IX of Fig. 1.

The gun carriage illustrated is a carriage for machine guns or light guns and it enables ground firing and anti-aircraft firing to be carried out at will. It comprises a carriage body 1, which can be supported, for example, by a tripod 2 having a locking device 3.

Figure 5:
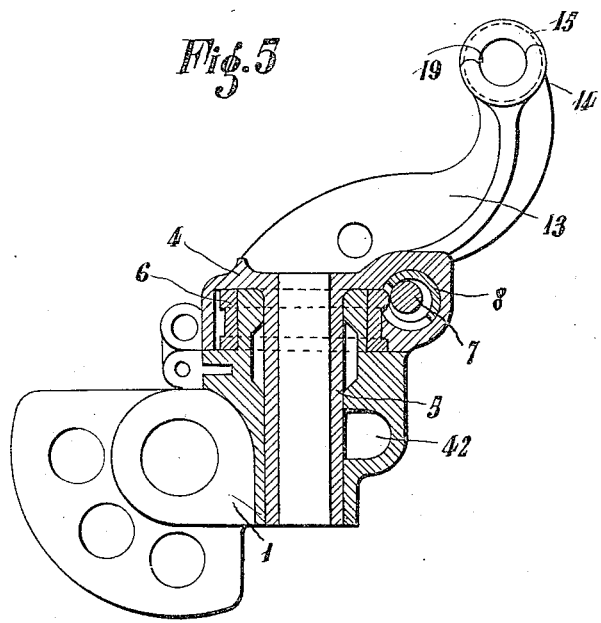
Fig. 5 is a sectional view of a detail along the line V—V of Fig. 2.

On said carriage body 1 a support 4 (see Figs. 1 and 5) can swivel, the support being provided for this purpose with a lower cylindrical extension 5, having a sliding fit in a corresponding housing of the carriage body 1. The latter has secured thereto a fixed toothed ring 6 with which cooperates a worm 7 which is eccentrically mounted in a socket 8 which is rotatable in a housing of the support 4.

Said socket 8 which is controlled by means of a handle 9 (see Figs. 1 and 2) can take up two positions, viz: a position in which the worm 7 is in engagement with the helicoidal toothed ring 6 (position of Fig. 5) and a second position in which said worm is disengaged from said ring. The socket 8 is held stationary in one or the other of said positions by a spring pin (not shown). For controlling the rotation about its axis, the worm 7 is provided with a milled knob 10 (see Figs. 1 and 2). It is obvious that, when the knob 10 is manipulated and the worm 7 is rotated when it is in engagement with the ring 6, the worm 7, and consequently the support 4, is caused to rotate about its pivotal axis on the carriage body 1. Said device constitutes the traversing gear, the operation of which can be controlled by providing, on the knob 10, graduations such as 11 cooperating with a fixed mark 12 carried, for example, by the handle 9, Fig. 2. A locking device enables the support 4 to be held stationary in the required position. Said locking device comprises, as shown in Figs. 1 and 9, a pin 36 at one of the ends of which is keyed a handle 37, whereas the other end 38 is tapped and screws into a wedge 39 cooperating with a free wedge 40 through which the pin 36 passes. Said two wedges, between which a spring 41 is interposed, are lodged in a recess 42 of the carriage body 1, and are adapted, when the handle 37 is operated, to grip and firmly hold the cylindrical extension 5 of the swinging support 4, which is thus prevented from rotating.

Two lateral branches 14 and 14a are provided above the swinging support 4, said branches having ribs at 13 and carrying an outer trunnion 15—15a which serves for swinging the cradle 16 and constituted by two lateral cheeks 17 and 17a which are held apart by rods 18 after having been mounted on the trunnions 15—15a. The upper end of the branches 14—14a are also provided with housings 19 and 19a in which, for ground firing, the usual trunnions of the gun engage, as will be seen hereinafter, said trunnions being held in said housings by spring catches 20 and 20a mounted in the trunnions 15—15a and can be operated from the outside by means of a knob 21—21a. When said trunnions have been engaged in said housings, their axis lies along the pivotal axis about which the cradle 16 pivots on the support 4. Moreover, as may be seen in Fig. 6, the axis of the gun barrel, which is the line of recoil of the gun, intersects the axis about which the cradle pivots on the support, so that no torque is created during firing which would tend to throw the gun out of its trained position.

On one of the sides of the cradle 16, on the left hand side, for example, there is provided an elevating gear which essentially comprises a rod 22 (Figs. 1, 3 and 4) pivoting on a pin 22a carried by the support 4 and on which a screw 23 having at its end a milled knob 24 is rotatably mounted. Said screw 23 is guided by a support 25 carried by the cradle 16 and constituted, for example, by two cheeks between which is arranged a portion of a nut 26 (Fig. 3) carried by a lever 27 pivoted at 28 and which can take up two positions, viz: the position shown in full lines in Fig. 3, in which said portion of a nut is in engagement with the screw 23, and the position shown in dotted lines in the same figure, and in which said portion of a nut 26 is disengaged from the screw 23. When the portion of a nut 26 is in engagement with the screw 23, the manipulation of the milled knob 24 trains the cradle 16, and consequently the gun M which, for ground firing, is secured to the cradle as will be seen hereinafter.

When, on the contrary, the portion of a nut 26 is disengaged from the screw 23, the movements of the cradle 16 can be very rapidly controlled by hand. In particular said cradle 16 can be very rapidly brought from the position which it occupies in Fig. 1, and which is the position for ground firing, to the position shown in Fig. 6, which is the position for anti-aircraft firing. In order to control the aiming for elevation, a fixed graduation 30 is provided on the end of the inner rod 22, said graduation cooperating with a movable graduation 31 carried by the corresponding face 32 of the milled knob 24 (see Fig. 4).

A locking device is provided for holding the cradle 16 stationary in any required position.

Said locking device comprises, as shown in Figs. 1 and 8, a pin 22a which is the one on which the rod 22 is pivoted and which is provided with two oppositely tapped threads 43 and 44 on which shoes 45 and 46 screw respectively. The pin 22a runs through the two sides of the support 4, and when the pin 22a is turned in the desired direction by means of an operating handle 47, the wedges 45 and 46 grip the cheeks 17 and 17a of the cradle 16 between themselves and the corresponding side of the support 4, thereby holding said cradle 16 stationary.

For ground firing (Figs. 1 and 7) the gun M is mounted in the following manner:

Its lateral trunnions M1 are engaged, as has been seen above, in the housings 19 and 19a of the branches 14—14a of the support 4. They are held in said housings by spring catches 20—20a. On the other hand, the rear rest M2 of the gun is engaged on either side of a groove 29 provided in the corresponding cheek 17—17a. The gun M is thus compelled to follow all the movements of the cradle 16 since the axis of the trunnions of the machine gun lie along the pivotal axis of said cradle. If, therefore, the elevating and traversing gears are in operative position, it will be possible to train and elevate the gun by the manipulation of the knobs 10 and 24.

On the contrary, when it is desired to perform anti-aircraft firing, the portion of the nut 26 is brought into its inoperative position (position shown in dotted lines in Fig. 3) and the cradle 16 is brought by hand into the position shown in Fig. 6, the machine gun having been previously removed. The trunnions M1 of the gun M are then engaged in the housings 33 provided at the rear end of the cradle 16, said end in that case constituting the upper end of the cradle as seen in Fig. 6, and being right above the support 4. The gunner can then easily manipulate the gun by direct action on the latter, the traversing gear being also disengaged.

Figure 7:
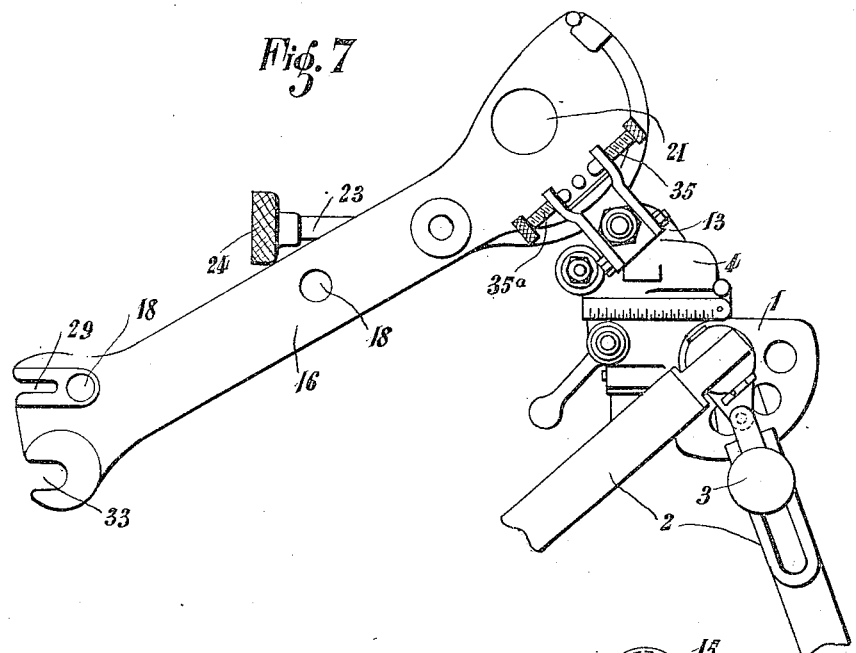
Fig. 7 is a view similar to Fig. 1, showing the right hand side of the gun carriage when it is in position for ground firing.

The carriage includes, in the usual manner, a sweeping fire limiting device constituted, for example, by two screws 34 and 34a and a stop placed between them, (see Fig. 2) and an elevation limiting device also constituted by two screws 35 and 35a and a fixed stop (see Fig. 7).

It is of course obvious that the invention has only been described and illustrated in a purely explanatory but in no way limitative manner, and that modifications of detail may be made therein without altering its spirit.

Having now particularly described and ascertained the nature of my said invention, and in what manner the same is to be performed, I declare that what I claim is:—

1. A mounting for machine guns or light guns adapted both for ground and anti-aircraft firing comprising in combination a tripod including a head, a support mounted to swivel on said head, a cradle pivotally mounted on said support, and housings provided at the upper end of said support in alignment with the axis about which the cradle pivots on said support, said housings being adapted to accommodate the trunnions of the gun.

2. A gun mounting according to claim 1, in which the pivot axis of the cradle intersects the axis of the gun barrel.

3. A mounting for machine guns or light guns adapted both for ground and anti-aircraft firing and comprising in combination a tripod including a head, a support mounted to swivel on said head, a cradle pivotally mounted on said support, housings provided at the upper end of said support in alignment with the axis about which the cradle pivots on said support, said housings being adapted to accommodate the trunnions of the gun, and spring catches located in the gun trunnions in alignment with the axis of said housings for maintaining said gun trunnions in said housings.

4. A mounting for machine guns or light guns adapted both for ground and anti-aircraft firing and comprising in combination a tripod including a head, a support mounted to swivel on said head, a cradle pivotally mounted on said support, housings provided at the upper end of said support in alignment with the axis about which the cradle pivots on said support, said housings being adapted to accommodate the trunnions of the gun, and a rear rest for said gun which for ground firing engages in grooves provided in the rear end of the cradle.

5. A mounting for machine guns or light guns adapted both for ground and anti-aircraft firing, and comprising in combination a tripod including a head, a support mounted to swivel on said head, a cradle pivotally mounted on said support, housings provided at the upper end of said support in alignment with the axis about which the cradle pivots on said support, said housings being adapted to accommodate the trunnions of the gun, spring catches located in the gun trunnions in alignment with the axis of said housings for maintaining said gun trunnions in said housings, and a rear rest for said gun which for ground firing engages in grooves provided in the rear end of the cradle.

6. A mounting for machine guns or light guns adapted both for ground and anti-aircraft firing and comprising in combination a tripod including a head, a support mounted to swivel on said head, a cradle pivotally mounted on said support, housings provided at the upper end of said support in alignment with the axis about which the cradle pivots on said support, said housings being adapted to accommodate the trunnions of the gun and a training device for said gun comprising a hollow screw, a rod pivotally mounted on the support and on which said hollow screw is rotatably mounted, a bracket member carried by said cradle and in which said screw is guided, a portion of a nut secured to said support, and means for bringing said nut portion into engagement with said screw for training said gun by means of said screw.

MAURICE de BOIGNE.